(12) United States Patent
Vatani et al.

(10) Patent No.: US 12,059,838 B2
(45) Date of Patent: Aug. 13, 2024

(54) METHOD AND APPARATUS TO PROCESS AND BOND LAYERS IN AN ADDITIVE MANUFACTURING SYSTEM

(71) Applicant: Sakuu Corporation, San Jose, CA (US)

(72) Inventors: Morteza Vatani, Los Gatos, CA (US); Seyed Mohammad Sajadi, Sunnyvale, CA (US)

(73) Assignee: Sakuu Corporation, San Jose, CA (US)

( * ) Notice: Subject to any disclaimer, the term of this patent is extended or adjusted under 35 U.S.C. 154(b) by 0 days.

(21) Appl. No.: 18/154,785

(22) Filed: Jan. 13, 2023

(65) Prior Publication Data

US 2023/0226746 A1 Jul. 20, 2023

Related U.S. Application Data

(60) Provisional application No. 63/299,863, filed on Jan. 14, 2022.

(51) Int. Cl.
*B29C 64/106* (2017.01)
*B29C 64/245* (2017.01)
(Continued)

(52) U.S. Cl.
CPC .......... *B29C 64/106* (2017.08); *B29C 64/245* (2017.08); *B29C 64/264* (2017.08);
(Continued)

(58) Field of Classification Search
CPC ............... B29C 64/106; B29C 64/264; B29C 64/245; B29C 64/393; B29C 64/223; B33Y 10/00; B33Y 30/00; B33Y 40/10; B33Y 50/02
(Continued)

(56) References Cited

U.S. PATENT DOCUMENTS 10,875,240 B2 12/2020 Abbott, Jr. et al.
2003/0226863 A1 12/2003 Hickle et al.
(Continued)

FOREIGN PATENT DOCUMENTS

EP 1946910 A2 7/2008

OTHER PUBLICATIONS

International Search Report and Written Opinion issued May 22, 2023 in corresponding PCT/US23/60765 filed Jan. 17, 2023—11 pages.

*Primary Examiner* — Nahida Sultana
*Assistant Examiner* — Lawrence D. Hohenbrink, Jr.

(57) ABSTRACT

An improved method and apparatus for adding a new layer to a stack of previously processed layers. In an example, a method is provided for mounting the previously processed layer on a build platform, mounting the new layer on a substrate, aligning the new layer with the previously processed layer, moving the new layer and the previously processed into contact with one another, and applying energy to the new layer from an energy source through the substrate to simultaneously process the new layer and bond the new layer to the previously processed layer to form a bonded processed multilayer stack on the build platform. A flexible compliant pressure conveyance media is moved into contact with the substrate to apply pressure to the new layer while the energy is being applied.

26 Claims, 10 Drawing Sheets

(51) Int. Cl.
  *B29C 64/264* (2017.01)
  *B29C 64/393* (2017.01)
  *B33Y 10/00* (2015.01)
  *B33Y 40/10* (2020.01)
  *B33Y 50/02* (2015.01)
  *B29C 64/223* (2017.01)
  *B33Y 30/00* (2015.01)

(52) U.S. Cl.
  CPC ............ *B29C 64/393* (2017.08); *B33Y 10/00* (2014.12); *B33Y 40/10* (2020.01); *B33Y 50/02* (2014.12); *B29C 64/223* (2017.08); *B33Y 30/00* (2014.12)

(58) Field of Classification Search
  USPC ........................................................ 264/308
  See application file for complete search history.

(56) References Cited

U.S. PATENT DOCUMENTS

| | | | |
|---|---|---|---|
| 2008/0169586 A1* | 7/2008 | Hull | B29C 64/264 264/494 |
| 2008/0226346 A1 | 9/2008 | Hull et al. | |
| 2013/0078013 A1* | 3/2013 | Chillscyzn | B29C 64/147 399/307 |
| 2014/0265032 A1* | 9/2014 | Teicher | B29C 64/112 264/401 |
| 2015/0273762 A1* | 10/2015 | Okamoto | B33Y 10/00 425/374 |
| 2018/0001554 A1* | 1/2018 | Thresh | B33Y 40/00 |
| 2019/0291346 A1 | 9/2019 | Rudolph | |
| 2019/0375159 A1 | 12/2019 | Rogren et al. | |
| 2020/0398480 A1 | 12/2020 | Ermoshkin et al. | |
| 2021/0379820 A1* | 12/2021 | Rogren | B41J 11/0022 |

* cited by examiner

METHOD AND APPARATUS TO PROCESS AND BOND LAYERS IN AN ADDITIVE MANUFACTURING SYSTEM

TECHNICAL FIELD AND RELATED APPLICATIONS

The present disclosure pertains to an improved method and apparatus for processing and bonding new layers (for example, non-cured layers) to previously processed layers (e.g., cured layers) in an additive manufacturing system.

There are many ways in which printed layers can be bonded together. One such method is described in U.S. Published Patent Application 2020/0398480. In this Published Application, radiation is used to cure a polymerizable liquid in order to bond the polymerizable liquid to a substrate or a three-dimensional object. However, in order for this method to be optimal, the surfaces being bonded should be perfectly flat. In developing the present disclosure, experiments were conducted by the inventors using an optically transparent pressure plate positioned between a belt and the three-dimensional object of the related Published Application to promote a uniform coating of the object. However, since the plate was flat, it was determined by the inventors of the present disclosure that this does not offer an optimal solution as to how to ensure that the two layers (e.g., the non-cured layer being added to the stack of cured layers, and the top cured layer it is being bonded to) are securely bonded across their entire surfaces. Added to which, liquid layers behave differently from powder-based layers which have been bonded together in some manner.

Accordingly, there is a need for methods and apparatuses to enable a more uniform transference of a non-cured patterned layer to previously cured patterned layers of a three-dimensional printed object in an AM manufacturing system.

SUMMARY OF THE INVENTION

A method for bonding a non-cured layer to a cured layer, including mounting the cured layer on a build platform, mounting the non-cured layer on a first side of a substrate, aligning the non-cured layer on the substrate with the cured layer on the build platform, moving the cured layer and the non-cured layer into contact with one another, applying energy to the non-cured layer from an energy source through the substrate to simultaneously cure the non-cured layer and bond the non-cured layer to the cured layer to form a bonded cured multilayer stack on the build platform, wherein the substrate is transparent to the energy, and moving a flexible compliant pressure conveyance media into contact with the substrate, on a second side of the substrate opposite the first side which the non-cured layer is mounted on, after the cured layer and the non-cured layer have been moved into contact with one another, to apply pressure to the non-cured layer while the energy is being applied.

A method for bonding a new layer to a previously processed layer, including mounting the previously processed layer on a build platform, mounting the new layer on a first side of a substrate, aligning the new layer on the substrate with the previously processed layer on the build platform, moving at least one of the new layer and the previously processed layer so that the new layer and the previously processed layer come into contact with one another, applying energy to the new layer from an energy source through the substrate to simultaneously process the new layer and bond the new layer to the previously processed layer to form a bonded processed multilayer stack on the build platform, wherein the substrate is transparent to the energy, and moving a flexible compliant pressure conveyance media into contact with the substrate, on a second side of the substrate opposite the first side of the substrate which the new layer is mounted on, after the previously processed layer and the new layer have been moved into contact with one another, to apply pressure to the new layer while the energy is being applied.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
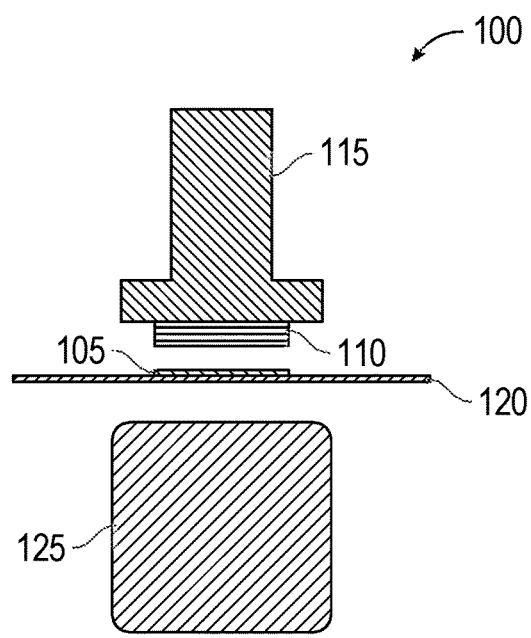
FIG. 1 shows a high-level view of an in-situ transfer, curing, and building mechanism in accordance with aspects of the present disclosure.

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing to one or more known techniques or operations, and such referencing can be at relatively high-level, to avoid obscuring of various concepts, aspects and features thereof with details not particular to and not necessary for fully understanding the present disclosure.

In conventional additive manufacturing (AM), the layers are built on top of each other, or they are built on a conveyor belt, and at the last stage, they are stacked on each other. However, as described in related U.S. Provisional Application 63/299,867 by the Applicant entitled "Printing Method and Apparatus for Additive Manufacturing, Including In-situ Powder Regeneration," and filed on Jan. 14, 2022, which is hereby incorporated by reference, a platform, for AM manufacturing system has been developed which is a modular based machine that builds each layer separately. Each individual layer passes several stations, and each station has a unique function. After processing in the various stations, the individual layers are stacked on a multilayer stack of cured layers that have already gone through the processing stations. The present disclosure pertains to a method and apparatus for simultaneously curing the non-cured individual layers at the time they are transferred and bonded to the stack of cured layers. The present disclosure can be incorporated into the system described in the above-noted related application as part of the curing and stacking operations in the overall 3D printing operation.

A key aspect of printing platform the related application mentioned above is the ability to transfer a printed layer from a substrate onto a build substrate or onto a stack of printed layers previously affixed to the build substrate. In an ideal world, the surface of both the printed layer to be transferred and the surface to which the printed layer is to be transferred would be completely flat, with no protrusions, depressions, or curvature. If they were completely flat, both layers would touch uniformly, thereby enabling the layers to be bonded securely to each other across the entire surface. However, in reality, printed layers created by patterning powdered particles are unlikely to be completely flat, and, when multiple ones of these printed layers are stacked to create an object, the chances of maintaining planarity decreases, resulting in non-uniform contact and bonding across the entire surfaces.

The present disclosure pertains to an improved method and apparatus for adding a new layer to a stack of previously processed layers. In one implementation, the disclosure pertains an improved method and apparatus to simultaneously cure and bond a new layer, such as a non-cured layer, to a stack of cured layers in an additive manufacturing system. In particular, in accordance with one aspect of this disclosure, a method and an apparatus are provided for mounting one or more cured layers on a build platform, mounting a non-cured layer on a first side of a substrate which is transparent to a predetermined type of energy that will be used for curing the non-cured layer (e.g., light forms, such as infra-red, or ultraviolet light, or ultrasound), aligning the non-cured layer on the substrate with the cured layer on the build platform, moving at least one of the cured layer and the non-cured layer so that the two layers come into contact with one another, and applying energy to the non-cured layer from an energy source (e.g., a light source) through the substrate (which is transparent to the light) to simultaneously cure the non-cured layer and bond the non-cured layer to the cured layer to form a bonded cured multilayer stack on the build platform. It is noted, however, that the present disclosure is not limited to only stacking non-cured layers on a stack of previously cured layers, and, instead, can be utilized in other situations where new layers, other than non-cured layers, are stacked on previously processed layers.

In accordance with another aspect of the present disclosure, a method and an apparatus are provided to enable a more uniform transference of the non-cured pattern to the previously cured patterns of a three-dimensional printed object. To this end, various types of pressure conveyance media are disclosed herein for applying a uniform pressure to an upper surface of the non-cured layer, after it is brought into contact with the stack of cured layers.

Figure 2:
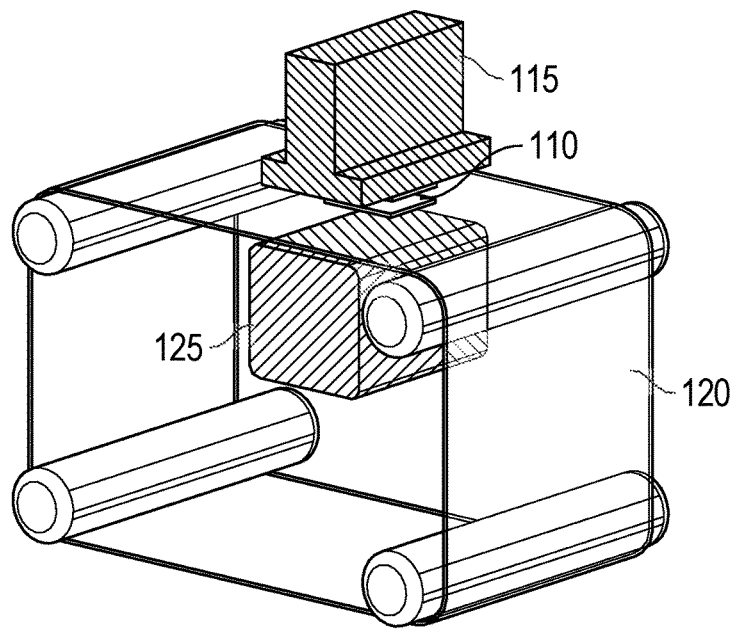
FIG. 2 shows a view of a belt format for in-situ transfer, cure, and build operations for an AM manufacturing system, in accordance with aspects of the present disclosure.

As shown in FIG. 1, an in-situ transfer, curing and building apparatus 100 is shown which allows for simultaneous curing and bonding of a non-cured layer 105 to one or more cured pattern layers 110 stacked on a build platform 115. The non-cured layer 105 is mounted on a substrate 120, which, as shown in FIGS. 1 and 2, can be a transparent conveyor belt (i.e., transparent to a particular type of light which will be used for curing the non-cured layer). In the particular examples of FIGS. 1 and 2, the type of light is UV light from a UV LED light source 125, and the substrate 120 (belt) can be made of Mylar. As will be discussed below, rather than a belt, the substrate 120 could be an individual substrate strips mounted on a carrier plate, as discussed, for example, in a related application by the Applicant (U.S. application Ser. No. 18/074,298), entitled "Carrier Plate and Method of Use Thereof," filed on Dec. 2, 2022, which is hereby incorporated by reference. Other materials (e.g., cyclic olefin and ultraviolet acrylic) could be used, if desired, instead of Mylar, for the transparent substrate 120. Also, if desired, other types of energy could be used for curing the non-cured layer, rather than UV light 125, for example infrared light, heat, ultrasound, etc.

In the example shown in FIGS. 1 and 2, the build platform 115 with the cured layers 110 mounted thereon is shown above the substrate 120 with the non-cured layer 105 mounted thereon, and the UV light source 125 is shown under the substrate 120. In this implementation, the stacked cured layers 110 have already been bonded to one another in previous operations, and they can be held on the build platform 115 by suction, for example, or another holding method that allows them to be suspended above the uncured layer. For example, an intermediate layer, such as a thermal release film, which is adhesive on at least one side, can be utilized between the build platform 115 and the stacked cured layers 110. When all the desired layers have been stacked on one another, the thermal release film is then heated, and the stacked layers 110 can be released from the intermediate layer, and the intermediate layer released from the build platform 115. In the implementations to be discussed with regard to FIGS. 4A-7B and FIGS. 9A-9C, on the other hand, the arrangement of the elements is inverse of that shown in FIGS. 1 and 2. Specifically, in these alternative implementations, the build platform 115 is under the stacked cured layers 110, and the substrate 120, with the printed non-cured layer 105 held on a front (lower) surface thereof, is located over the stacked cured layers 110. In this case, the UV light source 125 is located above the back (upper) surface of the substrate 120.

Figure 3A:
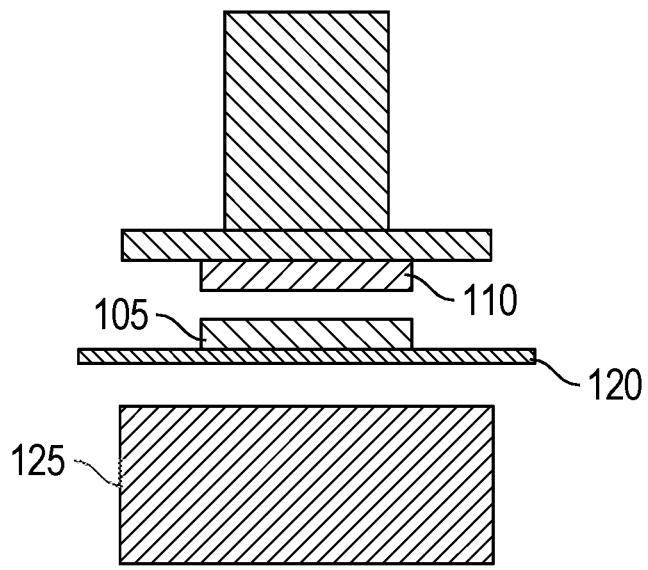
FIGS. 3A-3D show steps for the simultaneous curing and bonding of a non-cured layer to a stack of cured layers, in accordance with aspects of the present disclosure.
Figure 3B:
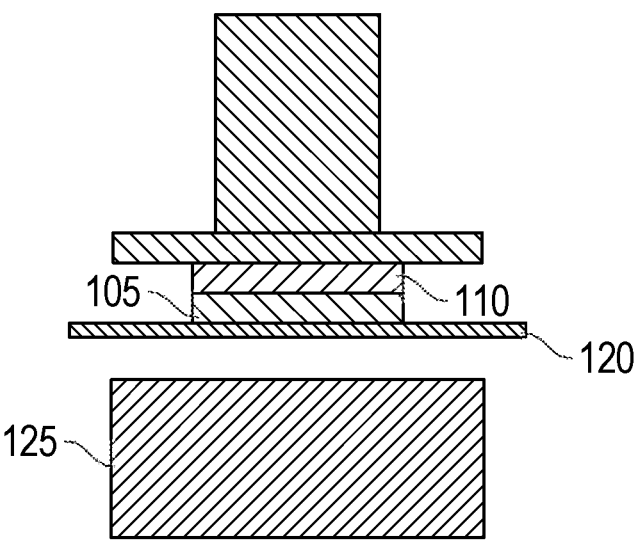
Figure 3C:
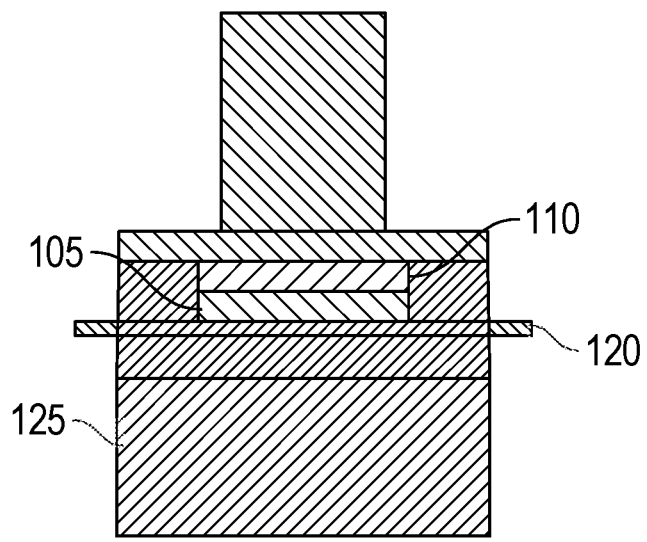
Figure 3D:
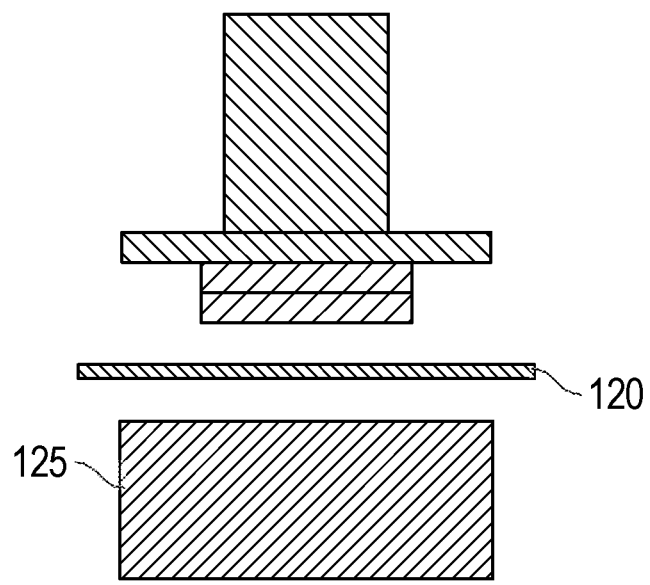

Steps of an exemplary process for directly transferring non-cured layers 105 from the substrate 120 to the stack of cured layers 110 on a build platform 115 are shown in FIGS. 3A-3C. A conditioned (or non-conditioned), non-cured patterned layer 105, mounted on a substrate 120, is indexed (aligned) between the UV light source 125 and the cured layers 110 on the build platform 115 in FIG. 3A. The build platform 115 is then moved downwards to bring the non-cured layer 110 on the substrate 120 into contact with an exposed cured layer 110 on the stack on the build platform 115, with or without applying pressure, in FIG. 3B. Alternatively, the substrate 120 can be moved upwards to achieve the same objective. In FIG. 3C, the UV light source 125 is activated to simultaneously cure and bond the non-cured layer 105 to the stacked cured layers 110. In FIG. 3D, the previously non-cured layer 105 is separated from the substrate 120, noting that the previously non-cured layer 105 is now a cured layer that is part of the multilayer stacked part 110 (e.g., a 3D object being built of multiple layers in a 3D printing process) on the build platform 115.

Figure 4A:
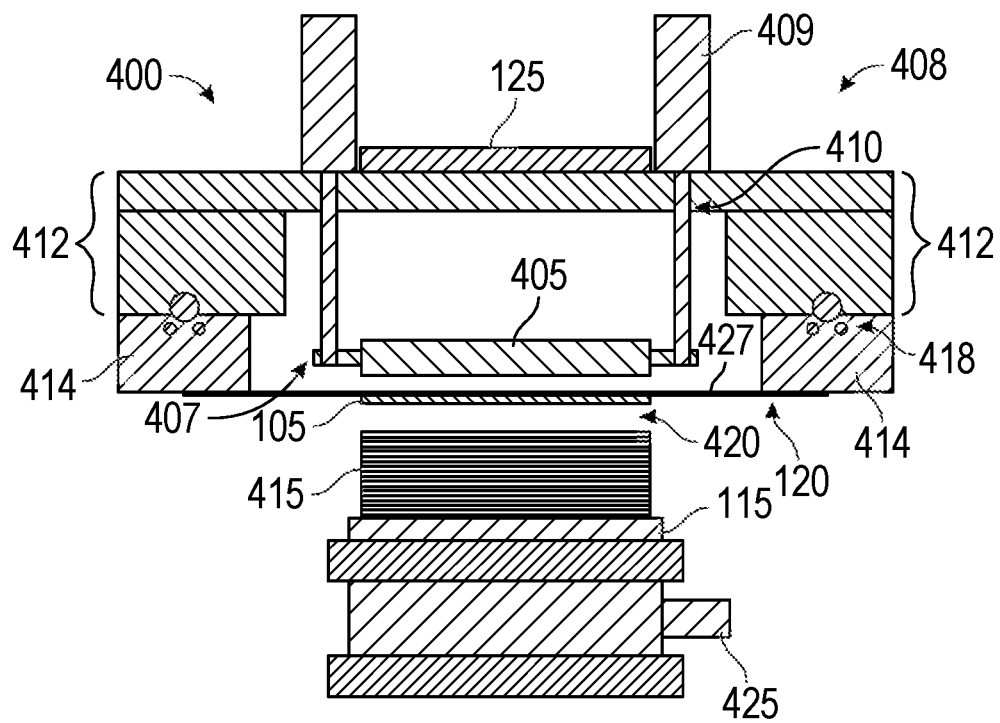
FIGS. 4A-4C show views of a rigid plate used as a pressure conveyance media for applying uniform pressure to the non-cured layer during curing and bonding, in accordance with aspects of the present disclosure.
Figure 4B:
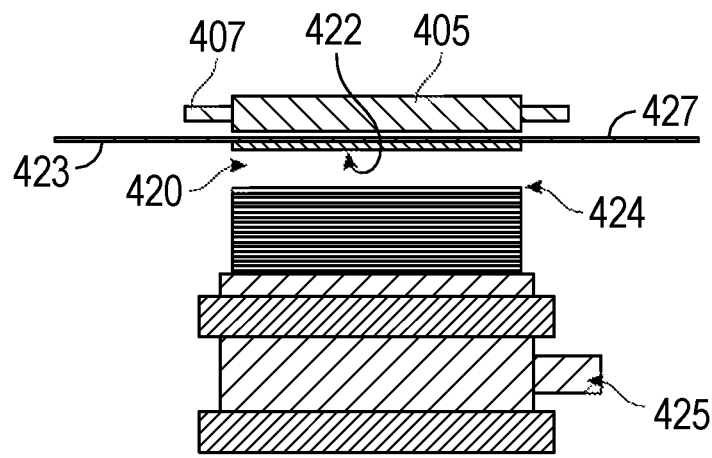
Figure 4C:
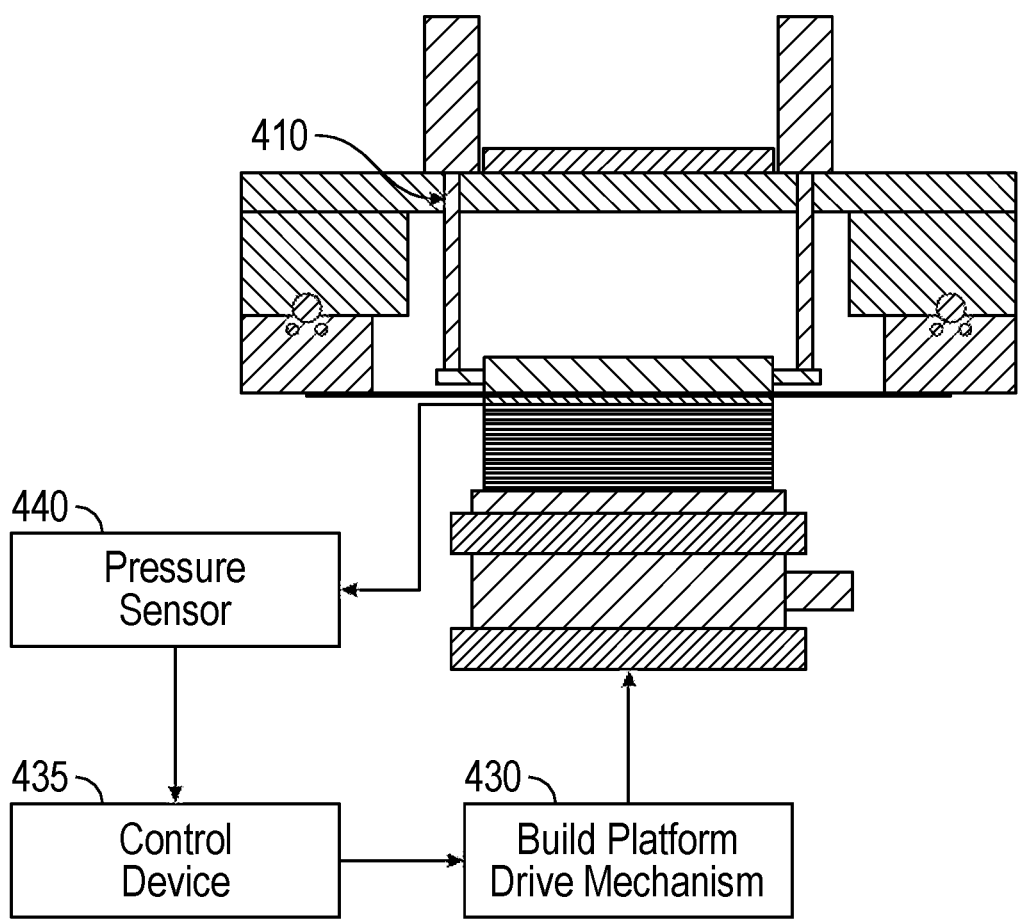

FIGS. 4A-4C show views of an alternative implementation of a curing and building apparatus 400 having a rigid plate used as a pressure conveyance media for applying uniform pressure to the non-cured layer 105 during curing and bonding, in accordance with aspects of the present disclosure. In one implementation, FIGS. 4A-4C utilize a floating pressure conveyance media 405 (for example, a rigid glass plate) mounted on a frame 407 to provide an improved bond between a printed layer 105 (e.g., a new layer, for example, a non-cured pattern layer) and a surface of the previously stacked layers 110 (e.g., the stack 415) of the part being three-dimensionally printed in an 3D AM manufacturing operation. FIG. 4A shows the pressure conveyance media 405 being separated from the upper surface 427 of the substrate 120 by virtue of a pressure application mechanism 408 (e.g., air cylinders 409 and piston rods 410) being in a retracted position. In this retracted position of the pressure application mechanism 408, there is a gap 420 between a bottom surface of the non-cured patterned layer 105 and an upper surface of the stack 415. The pressure application mechanism 408 is supported by a support structure 412. This support structure 412 is shown in FIG. 4A as a two-piece structure in FIG. 4A but could be a unitary structure if desired.

In FIG. 4A (and subsequent figures), an optional kinematic mount 418 is shown for mounting the support structure 412 with a carrier frame 414, which supports the substrate 120 (noting that such a carrier frame arrangement is discussed in detail below with regard to FIGS. 9A-9C). This kinematic mounting 418 allows a flexible connection arrangement with limited movement between the support structure 412 and the carrier frame 418. However, other mounting arrangements may be utilized between the support structure 412 and the carrier frame 418, if desired.

In an alternative configuration, at least a portion of the pressure conveyance media 405 is in contact with the upper surface of the substrate 120. FIG. 4B shows a gap 420 between a lower surface 422 of the non-cured printed layer 105 (mounted on a lower surface 423 of the substrate 120) and the upper surface 424 of the stack 415. FIG. 4C shows the pressure conveyance media 405 being contacted with the upper surface of the substrate 120 by virtue of the pressure application mechanism 410 (e.g., an air cylinder) being in an applied position and the stack of already cured layers 110 having been raised vertically upwards, by moving the build platform 115 upward. The pressure applied by the pressure application mechanism 410 may be fixed or variable, allowing a specific value to be selected. It is noted that, although the specific examples discussed herein, including the discussion which follows, are directed to stacking non-cured layers 105 on a stack of previously cured layers 110, the processes and apparatus disclosed here can be utilized in other situations where new layers other than non-cured layers 105 are stacked on previously processed layers 110. This could include situations where the new layers are in one state (e.g., at least partially liquid) and are converted, during the bonding process, into another state (e.g., solid).

The operation shown in FIGS. 4A and 4C accounts for non-uniformity of the surface topology between the non-cured printed layer 105 on the substrate 120 and the cured layers 110 on the stack, and allows for improved contact across the interface between their entire surfaces, not merely at a few point locations. This minimizes the potential for gaps between the two surfaces (i.e., non-cured layer 105 and the top cured layer 110), and optimizes mating between them.

Still referring to FIGS. 4A and 4C, the substrate 120 with a printed layer 105 (e.g., a conditioned and non-cured patterned layer) on the lower surface of the substrate is aligned between a UV source 125 and the multilayered 3D part 415 (e.g., a stack of cured layers) to which it is to be bonded to form a 3D printed object/part. Alignment can be achieved manually, by means of a fixture that ensures alignment (e.g., a carrier frame), and/or may rely on the use of sensors to confirm alignment (as shown, for example, in FIG. 5).

In another implementation, the printed non-cured layer 105 may be one of many printed non-cured layers 105 on a continuous substrate 120 (i.e., a conveyor belt configuration), and sensors may be used to determine when the printed non-cured layer 105 is appropriately aligned with the multi-layered 3D part 415 and the UV source 125. When alignment is determined, the movement of the conveyor belt can be stopped, and the printed non-cured layer 105 can be cured and bonded to the multi-layered 3D part 415 stacked on the building platform 115. If the printed non-cured layers 105 are a known distance from each other on the continuous substrate 120, rather than using sensors to sense when one of the non-cured layers is aligned with the stack of cured layers, merely measuring the distance of travel of the substrate 120 may suffice to achieve alignment of the next printed non-cured layer 105 to the UV source 125 and the multi-layer 3D part 415.

Although the UV source 125 in FIGS. 4A and 4B illustrates that the light source is located above the structure by which it is supported, it will be apparent to those of skill in the art that the arrangement may be such that the structure allows the UV radiation to reach the stacked cured layers 110 on the build platform 115 through an opening in the structure, or the UV source 125 may be located such that it is at least partially below the support structure.

Once aligned, the multi-layer 3D part 415 being manufactured, which is made up of the stack of already cured layers 110, is raised vertically upwards, by moving the build platform 115 upward, such that an upper surface of the last stacked cured layer 110 of the multi-layer part (or stack) 415 contacts the lower surface of the printed non-cured layer 105 on the lower surface of the substrate 120, continuing on until the upper surface of the substrate 120 contacts the pressure conveyance media 405.

Figure 5:
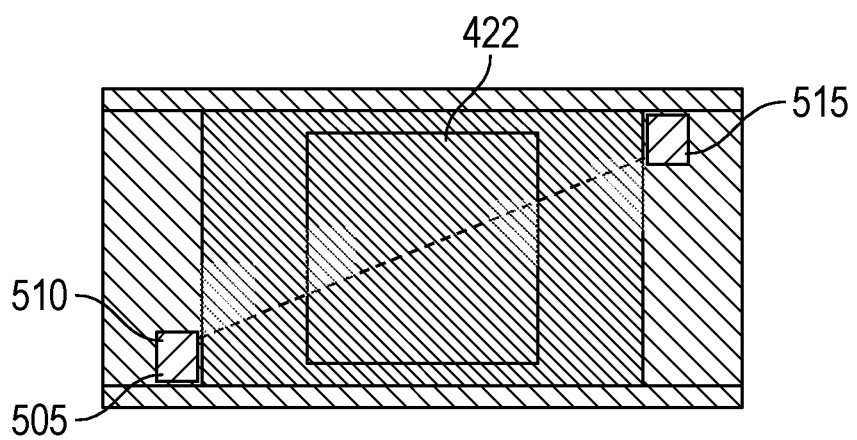
FIG. 5 shows a view of a through-beam sensor to detect the top of a stack of cured layers, in accordance with aspects of the present disclosure.

Referring to FIG. 5, a through-beam sensor 505 can be employed to detect the top of the stack of cured layers 110 on the build platform 115 with a transmitter 510 and a receiver 515 being located to span the surface of the stack 415. Though only one transmitter and receiver are illustrated, more may be utilized. This sensor 505 or another sensor can be used to determine a gap (e.g., spacing) from the non-cured layer 105 on the substrate 120 to the closest surface of the stacked cured layers 110, and also for determining alignment.

In another implementation, two or more sensors can be used to determine a gap 420 (e.g., spacing shown in FIGS. 4A and 4B) from the non-cured layer 105 on the substrate 120 to the closest of the stacked cured layers 110, at one or more locations across the non-cured layers 105, and the determined gap information can be fed back to modify operation of the pressure conveyance media 405. For example, in the event that the gap 420 on one side (e.g., the right-hand side) of the non-cured layer is greater than the gap 420 on the opposite side (e.g. the left-hand side) of the non-cured layer 105, more pressure may be applied to the right hand side than the left hand side of the non-cured layer 105 via the pressure application mechanism(s) 410. In this manner, based on the location and variation of the determined gaps 420, alignment and mating of the surface of the non-cured layer 105 that contacts the surface of the closest cured layer 115 can be optimized. In a further implementation, one or more pressure sensors (not shown) may be incorporated or integrated into the pressure conveyance media 405, with feedback from the sensors enabling modification of pressure to be applied via a number of pressure application mechanisms 410 in the specific areas where more or less pressure may be required and thereby optimize contact uniformity across the entire layer.

In an alternative implementation, one or more sensors, for example image acquisition devices, incorporated on or in the pressure conveyance media 405, can be utilized to determine the location(s) of non-cured material 105 on the substrate 120, and/or the cured material 110 on the closest stacked layer, and the determined location(s) fed back to adjust operation of the pressure application mechanism 410 to compensate for any differences between the layers. In this manner, should the stack of cured layers 110 comprise an area/location onto which no non-cured layer 105 is to be stacked, i.e. providing a gap/space in the non-cured layer 105, pressure may not be provided over that area, thereby minimizing unnecessary damage that might occur should pressure be applied. Additionally, as subsequent layers are stacked, information relating to any existing gaps/spaces (which may be intentional in design or unintentional) within the stacked structure may be utilized such that the pressure provided by the pressure application mechanism 410 can be adjusted accordingly, thereby minimizing damage transmitted through the layers of the multi-layer part (or stack) 415. In other words, the amount of pressure applied can take into consideration the patterned area—i.e., compensating for uncured areas, "holes" or gaps etc. in the layers 105 or 110.

Referring again to FIGS. 4A-4C, once contact is made between the substrate 120 and the lower surface of the pressure conveyance media 405, the stack 415 of cured layers 110 continues to move vertically upwards due to application of an upward driving force from the build platform drive mechanism 430, which is controlled by the control device 435, to create a desired uniform pressure between the lower surface of the non-cured layer 105 and the top surface of the topmost cured layer 110 on the stack 415 of cured layers. In some embodiments, the movement caused by the build platform drive mechanism 430 under the control of the control device 435 may comprise utilizing one or more predetermined offsets which may be determined based on the number of cured layers 110 that have already been created within the stack 415 or based on data from sensors which sense either the number of cured layers 110 or the height of the stack 415. A desired uniform pressure or a predetermined offset based on the number of cured layers 110 already created and stacked can remove stack-up error of height variance. In this manner, an amount of pressure can be applied regardless of how many of the cured layers are in the stack.

To this end, an amount of pressure can be controlled and applied to an uppermost one of the cured layers in the stack by the pressure conveyance media in dependence on a number of cured layers in the stack. In some implementations, the amount of pressure may also be controlled in dependence on the patterning of the layer. For example, predetermined offsets in the amount of pressure applied by the pressure conveyance media can be implemented based on the number of cured layers on the stack reaching predetermined levels. In one aspect of the disclosure, the height variance can be controlled by the control device 435, via the build platform drive mechanism 430 for up to 300 cured layers 110 on the build platform. In another aspect of the disclosure, historical data relating to the number of cured layers 110 already stacked, the offset used and/or the pressure measurement may be utilized by the control device 435 to determine the pressure required to be applied by the build platform drive mechanism 430 to provide a desired uniform pressure between the lower surface 422 of the non-cured layer 105 and the top/upper surface of the topmost cured layer 110 on the stack of cured layers. Utilization of a feedback mechanism from the pressure sensor 440 to the control device 435 can provide real-time dynamic pressure adjustment from the build platform drive mechanism to compensate for any height variance that may occur due to the number of layers in the stack 415. In other words, using the pressure sensed by the pressure sensor 440 at the lower surface 422 of the non-cured layer 105 and the upper surface 424 of the multilayer part (e.g., stack) 415, the control device 435 can control the build platform drive mechanism 430 to change the pressure applied between the lower surface 422 of the non-cured layer 105 and the upper surface 424 of the multilayer part 415 to compensate for any height variance that would otherwise occur due to differences in the number of layers already on the stack 415.

In one implementation of FIGS. 4A-4C, when the stack 415 is raised by raising the build platform 115, the pressure conveyance media 405 may be lifted, for example by 0.5 mm, thereby raising the pressure conveyance media 405 out of a pocket in a frame 407 within which it sits, allowing the pressure conveyance media 405 to "float" for aligning with and self-levelling to the stack 415. To this end, the pocket in the frame 407 can be beveled or can employ some other means to allow the pressure conveyance media 405 to move independently of the frame 407. Another example of a structure allowing the pressure conveyance media 405 to float in the frame 407 would be to provide springs in four corners of the pocket in the frame 407. In any case, regardless of the structure used, providing a floating feature for the pressure conveyance media 405 to allow it to float in the frame 407 can provide better alignment with an upper surface of the stack 415 which can be beneficial in terms of properly depositing the non-cured layer 105 on the upper surface 424 of the stack 415. It is also noted that, in one aspect of the disclosure, the substrate 120, which is flexible, may modify its surface topology under the pressure created by the pressure conveyance media 405, thereby minimizing potential gaps 420 between the non-cured layer 105 and the topmost cured layer 110 on the stack 415, optimizing mating between them.

Next, still referring to FIGS. 4A-4C, pressure is applied by the pressure application mechanism 410 to push the pressure conveyance media 405 against the upper surface of the substrate 120 (e.g., the side without the printed non-cured layer 105 on it) employing, for example, pressurized air cylinders or compression springs, to apply in the region of 0.1-50 psi pressure over the build area. The cylinders/springs can be guided by known means, such as channels or pins, to aid in achieving uniform pressure application. As shown in FIG. 4A, a load cell 425 can be provided, for example, in the build platform 115, in order to monitor the amount of pressure being applied by the pressure conveyance media 405. Of course, other means for monitoring the amount of pressure at different locations could be used as well.

Simultaneously with the application of pressure, or subsequently in an alternative implementation, the UV source 125 is activated, curing the printed non-cured layer 105 such that it bonds to the stack 415. For example, in this alternative implementation it is ensured that physical contact has been made between the layers before activating the UV light 125. In one implementation, as illustrated in FIG. 3C, the UV source 125 provides radiation across the entire surface to be treated. In other implementations, such as discussed below regarding FIG. 8A-8C, the UV source can provide a more localized source of radiation, with the UV source 125 being moved linearly to cover the entire area to be covered/cured.

Figure 6A:
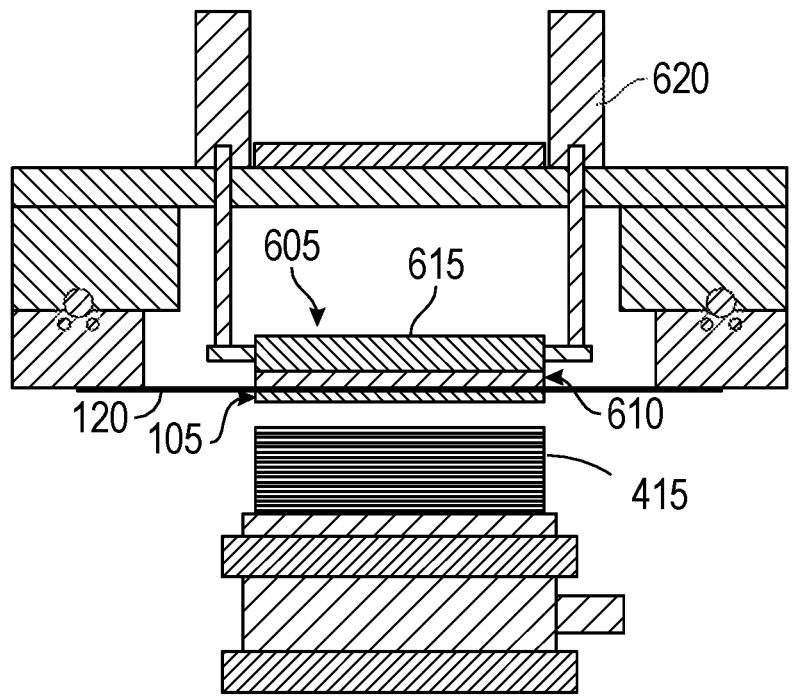
FIGS. 6A and 6B show views of a flexible compliant plate and an inflatable pressure chamber used as a pressure conveyance media for applying uniform pressure to the non-cured layer during curing and bonding, in accordance with aspects of the present disclosure.
Figure 6B:
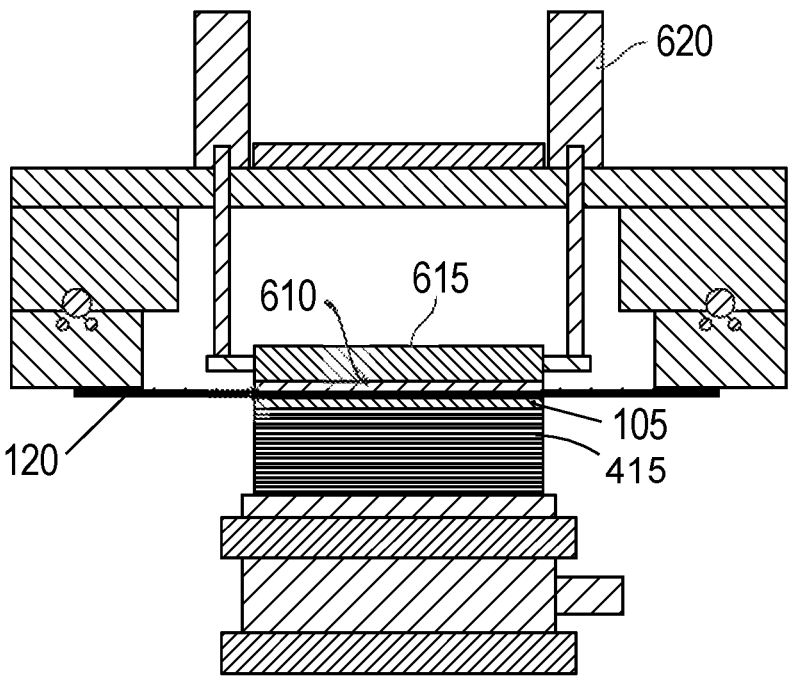

In another implementation shown in FIGS. 6A-6B the pressure conveyance media 605 includes a flexible/compliant layer 610 (UV transparent), such as PDMS or Mylar, mounted on a pressure chamber 615 (also made up of a UV transparent flexible material), such that the flexible/compliant layer 610 in interposed between the pressure chamber 615 and an upper surface of the substrate 120 (e.g., a second side or surface of the substrate 120 opposite a side of the substrate 120 that the non-cured printed layer 105 is located on). In this example, flexibility in both the pressure conveyance media 605 and the substrate 120 allows for greater compensation and improved contact between surfaces, as well as uniform application of pressure. In this implementation, the pressure conveyance media 605 is a structure comprising the combination of the pressure chamber 615 and the flexible/compliant layer 610. In one implementation, the flexible/compliant layer 610 forms one side of the pressure chamber 615 and is in direct contact with the pressurized air within the pressure chamber 615. Alternatively, the flexible/compliant layer 610 can be a separate layer located on a lower wall of the pressure chamber 615.

After the part made up of the stacked cured layers 110 has been moved vertically upwards by the build platform 115 to initially contact the pressure conveyance structure 605 (comprising the pressure chamber 615 and the flexible/compliant layer 610), before using pressurized air cylinders 620 to apply pressure to the topmost cured layer 110 in the stack 415, the pressure is increased within the pressure chamber 615, inflating the flexible/compliant layer 610, and enabling contact to be achieved across the entire interface between non-cured layer 105 and the upper surface of the topmost cured layer 110 of the stack 415. In this manner, when the air cylinders 620 of the pressure application mechanism are activated to apply pressure, pressure is applied uniformly across the entire layer 105. In an alternative configuration, the use of the pressure chamber 615 may eliminate the need for use of the pressure cylinder 620 arrangement by applying enough pressure to ensure both elimination of gaps between the interfacing layers and sufficient pressure for bonding the interfacing layers together.

Figure 7A:
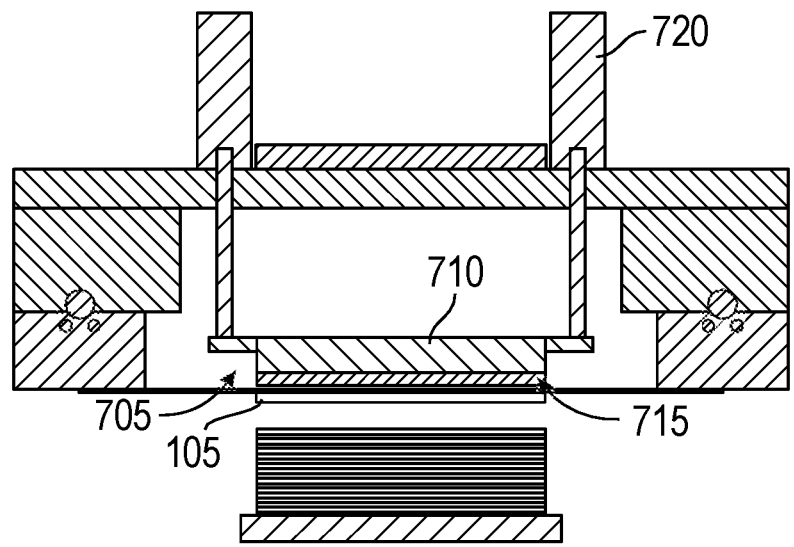
FIGS. 7A and 7B show views of a conforming layer and a rigid plate used in combination as a pressure conveyance media for applying uniform pressure to the non-cured layer during curing and bonding, in accordance with aspects of the present disclosure.
Figure 7B:
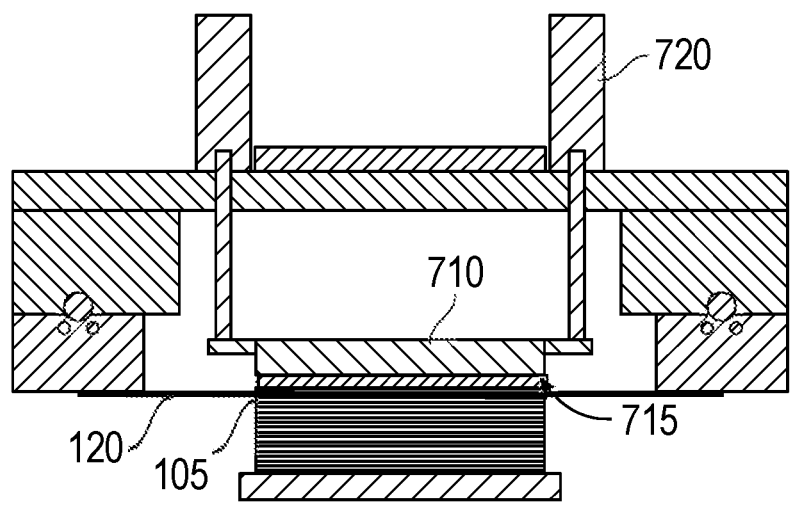

Referring next to FIGS. 7A and 7B, in another implementation the pressure conveyance media 705 may comprise a solid (rigid) transparent glass plate 710 (UV transparent) with a soft conforming layer 715 on the surface between the upper surface of the substrate 120 and the glass plate 710. This eliminates the need for a pressure chamber 615, but still provides a degree of flexibility to compensate for unevenness of the surfaces of the interfacing layers being bonded.

As pressure is applied to the rigid glass plate 710 by the pressure application mechanism 720 (e.g., air cylinders or compression springs), the soft flexible/compliant layer 715 conforms to the surface topology of the upper surface of the substrate 120, once again allowing for greater compensation and improved contact between the non-cured layer 105 mounted on the lower surface of the substrate 120 and the upper surface of the topmost cured layer 110 of the stack 415. This configuration may also be combined with the floating operation described above regarding FIGS. 4A and 4B, to further ensure uniform contact.

Figure 8A:
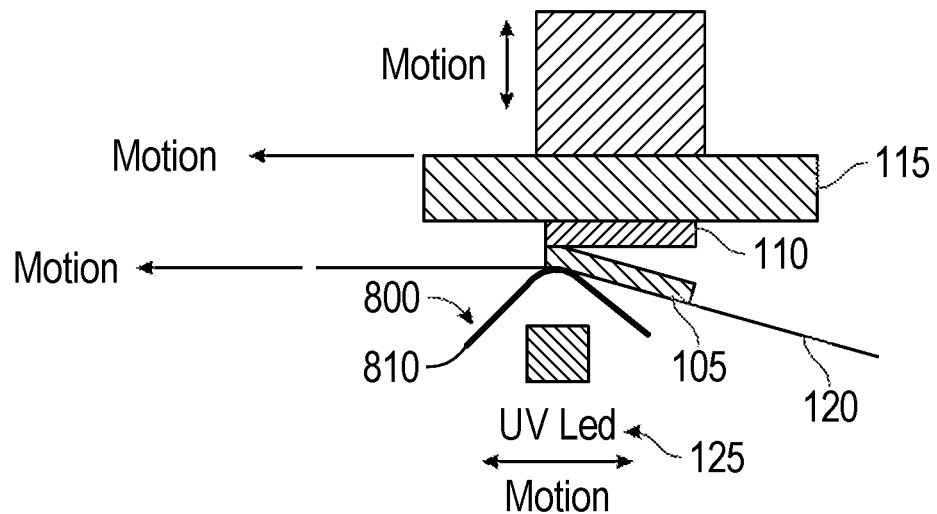
FIGS. 8A-8C shows a view of a bent plate used as a pressure conveyance media for applying uniform pressure to the non-cured layer during curing and bonding, in accordance with aspects of the present disclosure.
Figure 8B:
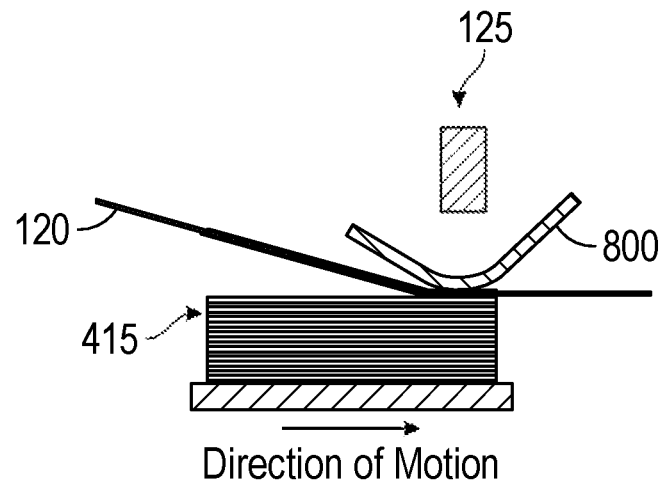
Figure 8C:
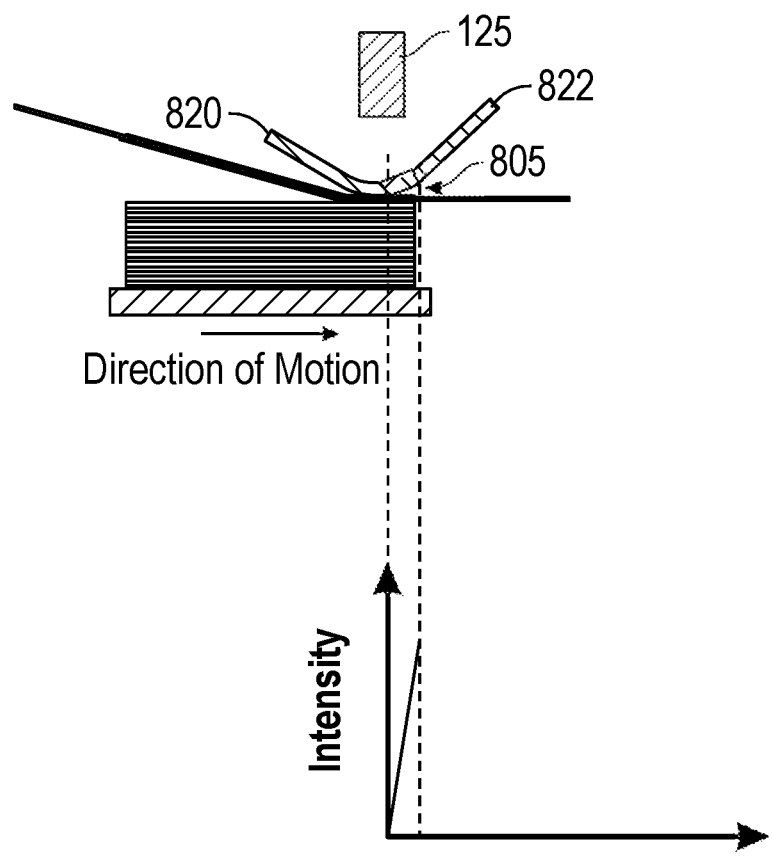

Another implementation of the present disclosure is shown in FIGS. 8A-8C, using a pressure conveyance media 800 in the form of a bent plate 810. In this implementation, a moving line contact is formed to facilitate the bonding between the cured and non-cured layers.

In the implementation of FIGS. 8A-8C, the UV source 125 provides localized curing, requiring that either the UV source 125 and the bent plate 810 move together across the surface of the printed non-cured layer 105 to facilitate curing (as illustrated in FIG. 8A), or that the part made up of the stacked layers 110 and the substrate 120 both move simultaneously beneath the UV source 125 and the bent plate 810, as illustrated FIGS. 8B and 8C. In this arrangement, there is a chance, depending upon materials, UV power/frequency and overall conditions, that an area outside the intended curing point may be partially cured. To reduce the chances of this occurring, a blocking feature may be incorporated, shielding the area outside the intended area from curing, or at least minimizing the degree of curing. Shaping of the pressure conveyance media 800 (e.g., a glass plate) may aid in this, and/or provide a surface on which a blocking feature, such as a coating, may be applied. For example, as shown in FIGS. 8C, the pressure conveyance media 800 can be formed as the bent plate 810 with the transparent window 805 as the contact portion, located between two coated opaque leg portions 820, 822 of the bent plate 810 that will block the light from the UV light source 125. The transparent window 805 can be formed from glass, plastics or a combination which is UV transmissible (or transmissible for another light source being used). This line contact configuration may also be combined with the floating operation described above with regard to FIGS. 4a and 4b, to further ensure uniform contact.

Timing of the motion of the substrate 120 or UV source 125, combined with the location and size of the transparent window 805 is important to facilitate an optimal transfer. Once a point of the pressure conveyance media 800 contacts the upper layer of the part being manufactured (i.e., the stacked layers 415), the printed non-cured layer 105 within the transparent window 805 is partially cured, and as the substrate/UV source moves away from the original contact point, the printed non-cured layer 105 transfers and becomes fully cured. The UV intensity is such that, at the point of contact on the leading edge of the UV window 805, the intensity is low, and increases moving away from the contact point to the trailing edge of the UV window 805, enabling transference of the non-cured layer 105 to the stack 415 of cured layers 110 to occur before the printed non-cured layer 105 becomes fully cured.

Figure 9A:
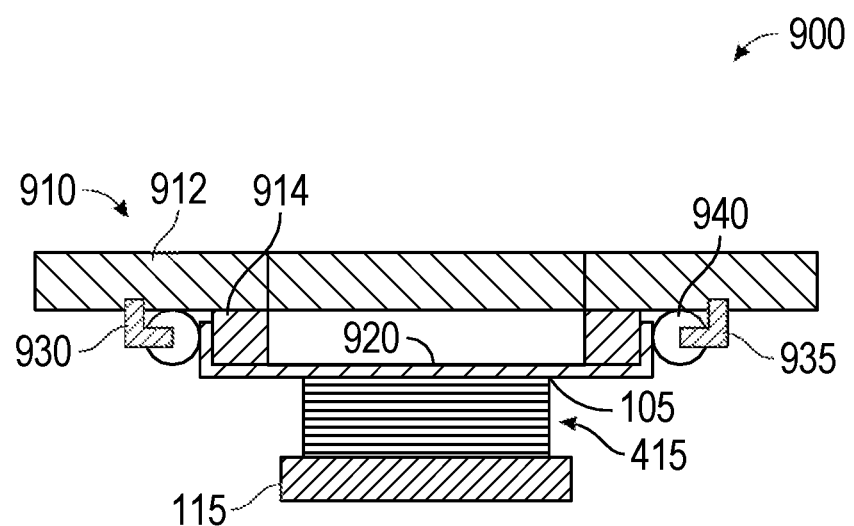
FIGS. 9A-9C show views of an apparatus for removing the substrate, which has been mounted on a carrier plate, from the non-cured layer for depositing the non-cured layer on a stack of cured layers on a build platform, in accordance with aspects of the present disclosure.
Figure 9B:
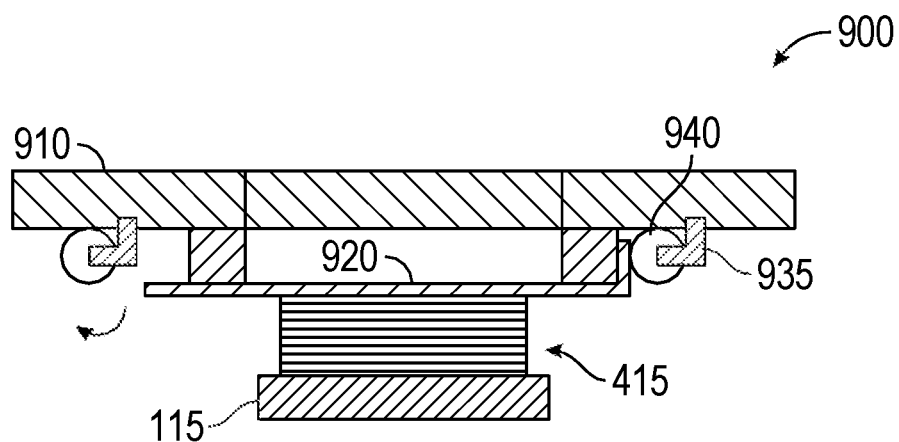
Figure 9C:
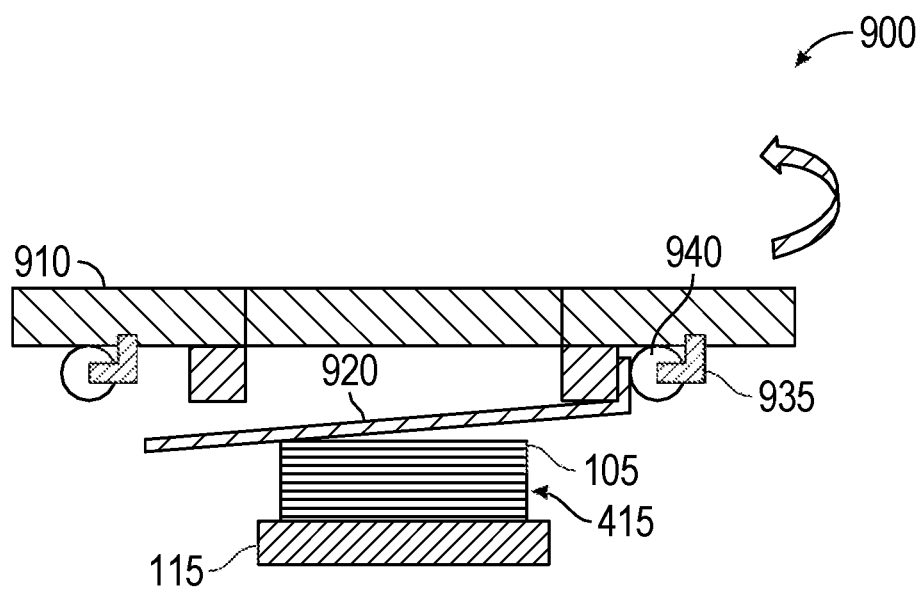

FIGS. 9A-9C show views of an apparatus 900 for removing a substrate strip 920, which has been mounted on a carrier frame 910 (as opposed to being mounted on a continuous substrate 120, as in the implementations discussed above), from the non-cured layer 105 for depositing the non-cured layer 105 on a stack 415 of cured layers 110 on a build platform 115, in accordance with aspects of the present disclosure. The carrier frame 910 includes a base portion 912 and a mounting portion 914 that a substrate strip 920 is mounted on. In this regard, it is noted that the term "substrate strip" refers to a portion of a continuous substrate (with a plurality of powder layers deposited thereon) that has been cut into a plurality of individual substrate strips 920, each with one of the plurality of powder layers 105 mounted thereon. It is also noted that the carrier plate 910 can have an open center (not shown) to allow access to the pressure conveyance media 405 shown, for example, in FIGS. 4A-4C (or the bent plate 810 shown in FIG. 8A) to the side of the substrate strip 920 opposite the side the non-cured layer 105 is deposited on to apply pressure to the substrate strip 920 and the non-cured layer 105, as described above.

Specifically, to finalize transference of the printed non-cured layer 105 onto the stack 415 on the build platform 115, the substrate strip 920 mounted on a carrier frame 910 has to be removed from the upper surface of the stacked part 415 being manufactured on the built platform, which stacked part 415 now includes the non-cured layer 105 that was mounted on the substrate strip 920. In this implementation, the substrate strip 920 is carried by a carrier frame 910 such as discussed in the related application mentioned above. The carrier frame 910 can be utilized to achieve full transference of the printed non-cured layer 105 from the surface of the substrate strip 920 to the build platform 115. The carrier frame 910 design, which is described in greater detail in the above-noted related application, allows a strip 920 of substrate to be carried, with one end of the strip 920 being clamped independently by a clamp 930 from the other end of the strip 920 clamped by a clamp 935. This novel carrier frame design also enables the system to alternate which end of the substrate strip 920 is clamped/unclamped by the clamps 930 and 935 for each consecutive layer, thereby providing a method to reduce stresses which might accumulate in the layer stacking process.

Referring again to FIGS. 9A-9C, to implement the substrate strip removal process, one end of the substrate strip 920 is unclamped from the carrier frame 910 to begin the removal process. In one implementation (FIG. 9B), rotary air actuators (not shown) move clamping bars 940 on each of the clamps 930 and 935 on the carrier frame 910 to move the clamping bars from the clamped to the unclamped position. Rod locks (not shown) can be engaged on air cylinders on a carrier lift stage to move the carrier frame 910 towards contact. The carrier frame 910 and build platform 115 can be lowered in sync to a peel position (FIG. 9C) in which the non-cured layer 105 will be peeled from the substrate strip 920 mounted on the carrier frame 910 to be cured and bonded to the stack 415 of cured layers 110. A gripping mechanism (not shown), for example a tool at the end of a robotic arm, grips the carrier frame 920. The air cylinders are rod unlocked and then retracted. The gripper on the robotic arm moves the carrier frame up and to the side and rotates to peel the flexible substrate strip 920 away from the transferred non-cured layer 105 (FIG. 9C). It is noted that, in one implementation, the peel direction alternates right/left for each consecutive non-cured layer 105 to reduce stresses in the layer building operation. When the printed non-cured layer 105 has been completely transferred to the top of the stacked layers 110, the gripper on the robotic arm moves to place the "used" carrier frame 910 to a predetermined location, where it can be used to support subsequent substrate segments with printed non-cured layers 105 thereon.

To ensure that the gripper of the robotic arm, the robotic arm, or the various air/pneumatic cylinders do not operate at inappropriate times (for example, to ensure that the robotic arm does not move the carrier frame when both ends of the substrate strip still remain clamped), various sensors (not shown) are incorporated. These sensors provide data, for example, to ensure that the carrier frame 910 is not moved until there is confirmation that one end of the substrate strip 920 on the carrier frame 910 has been unclamped by one of the clamps 930 and 935.

In the techniques discussed above, all the curing, transfer, bonding and building happens at the same time (or at substantially the same time) with only UV curing, with or without applying pressure to assist in the bonding and adhesion of the layers. The surface of the substrate can be easily controlled to minimize the adhesion between the cured pattern layers and substrate which carries the non-cured layer. These simultaneous operations increase the production rate. It may also reduce the risk involved in achieving transfer and uniform bonding. The bonding and curing mechanism described herein is based on UV curing, although other curing techniques could be used, such as heating, using ultrasound or using other types of light. The adhesion between the cured and non-cured layers can also be controlled by a UV binder, if desired.

It is noted that although the above description has primarily been presented in terms of curing and bonding layers to previously cured layers in a stack in the environment of additive manufacturing, such as 3D printing, the apparatus and method of this disclosure is not limited to only such structure, and they could be used in any situation where it is desired to simultaneously cure and bond layers to a stack of previously cured and bonded layers.

In the following, further features, characteristics and advantages of the instant application will be described by means of items:

Item 1: A method for bonding a non-cured layer to a cured layer, including mounting the cured layer on a build platform, mounting the non-cured layer on a first side of a substrate, aligning the non-cured layer on the substrate with the cured layer on the build platform, moving the cured layer and the non-cured layer into contact with one another, applying energy to the non-cured layer from an energy source through the substrate to simultaneously cure the non-cured layer and bond the non-cured layer to the cured layer to form a bonded cured multilayer stack on the build platform, wherein the substrate is transparent to the energy, and moving a flexible compliant pressure conveyance media into contact with the substrate, on a second side of the substrate opposite the first side which the non-cured layer is mounted on, after the cured layer and the non-cured layer have been moved into contact with one another, to apply pressure to the non-cured layer while the energy is being applied.

Item 2: The method of item 1, further comprising separating the bonded cured multilayer stack from the substrate.

Item 3: The method of item 1 or 2, wherein the energy source is UV light.

Item 4: The method of any of items 1-3, wherein the build platform is located above the cured layer, the substrate is located under the non-cured layer, and the energy source is located under the substrate.

Item 5: The method of any of items 1-4, wherein the cured layer and the non-cured layer are moved into contact by moving the build platform downward to move the cured layer on the build platform into contact with the non-cured layer on the substrate.

Item 6: The method of any of items 1-5, wherein the build platform is located below the cured layer, the substrate is located above the non-cured layer, and the energy source is located above the substrate.

Item 7: The method of any of items 1-6, wherein the cured layer and the non-cured layer are moved into contact by moving the build platform upward to move the cured layer on the build platform into contact with the non-cured layer on the substrate.

Item 8: The method of any of items 1-7, wherein the pressure conveyance media is comprised of a plate.

Item 9: The method of any of items 1-8, wherein the plate is comprised of glass.

Item 10: The method of any of items 1-9, wherein the pressure conveyance media further comprises a pressure chamber located on a side of the flexible compliant layer opposite a side of the flexible compliant layer that contacts the second side of the substrate.

Item 11: The method of any of items 1-10, wherein the pressure chamber is inflatable to exert pressure on the flexible compliant layer.

Item 12: The method of any of items 1-11, wherein the pressure conveyance media is comprised of a conforming layer mounted on a rigid plate, the flexible compliant layer being located between the rigid plate and the second side of the substrate.

Item 13: The method of any of items 1-12, wherein the pressure conveyance media is comprised of a bent plate having a contact portion located between first and second leg portions on opposite sides of the contact portion.

Item 14: The method of any of items 1-13, wherein the contact portion is the only portion of the pressure conveyance media that contacts the substrate.

Item 15: The method of any of items 1-14, further comprising creating relative movement between the bent plate and the second side of the substrate to move the contact portion of the pressure conveyance media along the second side of the substrate to exert pressure on the non-cured layer on the first side of the substrate, wherein the first and second legs of the bent plate are held out of contact with the second side of the substrate.

Item 16: The method of any of items 1-15, wherein the contact portion of the bent plate includes a window portion which is transparent to the energy, and wherein the first and second legs of the bent plate are opaque to the energy.

Item 17: The method of any of items 1-16, wherein the substrate and the non-cured layer are flexible, and wherein the flexible substrate and the non-cured layer are held out of contact with the cured layer until the contact portion of the bent plate presses the non-cured layer onto the cured layer as the contact portion of the bent plate is moved along the second side of the substrate.

Item 18: The method of any of items 1-17, wherein the energy source is configured to increase intensity of the energy applied through the transparent window in the contact portion of the bent plate to increase from a first light level at a leading edge of the window to a second light level at a trailing edge of the window as the window is moved over the second side of the substrate.

Item 19: The method of any of items 1-18, wherein the energy source is heat.

Item 20: The method of any of items 1-19, wherein a plurality of cured layers are mounted on the build platform to form a stack of cured layers on the build platform, and an amount of pressure applied by the pressure conveyance media is controlled to apply a uniform pressure to an uppermost one of the cured layers in the stack regardless of how many of the cured layers are in the stack.

Item 21: The method of any of items 1-20, wherein a plurality of cured layers are mounted on the build platform to form a stack of cured layers on the build platform, and an amount of pressure is applied to an uppermost one of the cured layers in the stack by the pressure conveyance media in dependence on a number of cured layers in the stack.

Item 22: The method of any of items 1-21, wherein the number of cured layers in the stack is determined by a sensor.

Item 23: The method of any of items 1-22, wherein predetermined offsets in the amount of pressure applied by the pressure conveyance media are implemented based on the number of cured layers on the stack reaching predetermined levels.

Item 24: The method of any of items 1-23, wherein an amount of pressure applied to an uppermost one of the cured layers in the stack by the pressure conveyance media is dependent on a determination of gaps existing in the cured layers of the stack.

Item 25: The method of any of items 1-24, wherein an amount of pressure is applied to an uppermost one of the cured layers in the stack by the pressure conveyance media in dependence on variations in a gap between the non-cured layer and the uppermost cured layer of the stack.

Item 26: The method of any of items 1-25, wherein the amount of pressure applied by the pressure conveyance media is controlled by a feedback system comprised of a pressure sensor configured to provide a pressure measurement of the pressure applied to the non-cured layer by the pressure conveyance media, a control device coupled to receive the pressure measurement from the pressure sensor, and a build platform drive mechanism configured to drive the build platform to increase the pressure or decrease the pressure based on the pressure measurement received by the control device.

Item 27: The method of any of items 1-26, wherein a plurality of cured layers are mounted on the build platform to form a stack of cured layers on the build platform, and the pressure conveyance media is located in a frame and is configured to move independently in the frame to self-align with an uppermost one of the cured layers on the stack.

Item 28: The method of any of items 1-27, wherein the substrate is a substrate strip and is mounted on a carrier plate having a first securing device configured to secure a first end of the substrate strip to the carrier plate and a second securing device configured to secure a second end of the substrate strip, opposite the first end, to the carrier plate.

Item 29: The method of any of items 1-28, wherein the method further comprises moving the non-cured layer mounted on the substrate strip into contact with the cured layer by moving at least one of the carrier plate and the build platform, releasing one of the first and second securing devices to free one of the first and second ends of the substrate strip while the other of the first and second ends remains secured, and moving the carrier plate and the build platform away from one another by moving at least one of the carrier plate and the build platform so that the substrate strip peels away from the non-cured layer mounted on the substrate strip.

Item 30: The method of any of items 1-29, wherein the method further comprises mounting a second non-cured layer on the first side of the substrate, moving the second non-cured layer mounted on the substrate strip into contact with the cured layer by moving at least one of the carrier plate and the build platform, releasing the other of the first and second securing devices to free the other of the first and second ends of the substrate strip while the one of the first and second ends remains secured, and moving the carrier plate and the build platform away from one another by moving at least one of the carrier plate and the build platform so that the substrate strip peels away from the second non-cured layer mounted on the substrate strip.

Item 31: A method for bonding a new layer to a previously processed layer, comprising mounting the previously processed layer on a build platform, mounting the new layer on a first side of a substrate, aligning the new layer on the substrate with the previously processed layer on the build platform, moving at least one of the new layer and the previously processed layer so that the new layer and the previously processed layer come into contact with one another, applying energy to the new layer from an energy source through the substrate to simultaneously process the new layer and bond the new layer to the previously processed layer to form a bonded processed multilayer stack on the build platform, wherein the substrate is transparent to the energy, and moving a flexible compliant pressure conveyance media into contact with the substrate, on a second side of the substrate opposite the first side of the substrate which the new layer is mounted on, after the previously processed layer and the new layer have been moved into contact with one another, to apply pressure to the new layer while the energy is being applied.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. For example, although described as a method for curing and bonding non-cured layers to a stack of cured layers, the methodology can be applied to any layer of material which is created in one phase (e.g., fluid), to which energy is subsequently applied to convert the layer or material to another phase (e.g., solid), while simultaneously being bonded to previously bonded layers. For example, thermoplastic layers to which heat can be applied to convert them into bonding layers; or monomers, which can be polymerized to form polymers using heat.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The invention claimed is:

1. A method for bonding a non-cured layer to a cured layer, comprising:
   mounting the cured layer on a build platform;
   mounting the non-cured layer on a first side of a substrate;
   aligning the non-cured layer on the substrate with the cured layer on the build platform;
   moving the cured layer and the non-cured layer into contact with one another;
   applying energy to the non-cured layer from an energy source through the substrate to simultaneously cure the non-cured layer and bond the non-cured layer to the cured layer to form a bonded cured multilayer stack on the build platform, wherein the substrate is transparent to the energy;
   moving a flexible compliant pressure conveyance media into contact with the substrate, on a second side of the substrate opposite the first side which the non-cured layer is mounted on, after the cured layer and the non-cured layer have been moved into contact with one another, to apply pressure to the non-cured layer while the energy is being applied, wherein the flexible compliant pressure conveyance media is comprised of a bent plate having a contact portion located between first and second leg portions on opposite sides of the contact portion, and wherein the contact portion is the only portion of the flexible compliant pressure conveyance media that contacts the substrate; and
   creating relative movement between the bent plate and the second side of the substrate to move the contact portion of the flexible compliant pressure conveyance media along the second side of the substrate to exert pressure on the non-cured layer on the first side of the substrate, wherein the first and second legs of the bent plate are held out of contact with the second side of the substrate, wherein the contact portion of the bent plate includes a window portion which is transparent to the energy, and wherein the first and second legs of the bent plate are opaque to the energy.

2. The method according to claim 1, further comprising separating the bonded cured multilayer stack from the substrate.

3. The method according to claim 1, wherein the energy source is UV light.

4. The method according to claim 1, wherein the build platform is located above the cured layer, the substrate is located under the non-cured layer, and the energy source is located under the substrate.

5. The method according to claim 4, wherein the cured layer and the non-cured layer are moved into contact by moving the build platform downward to move the cured layer on the build platform into contact with the non-cured layer on the substrate.

6. The method according to claim 1, wherein the build platform is located below the cured layer, the substrate is located above the non-cured layer, and the energy source is located above the substrate.

7. The method according to claim 6, wherein the cured layer and the non-cured layer are moved into contact by moving the build platform upward to move the cured layer on the build platform into contact with the non-cured layer on the substrate.

8. The method according to claim 1, wherein the flexible compliant pressure conveyance media is comprised of a plate.

9. The method according to claim 8, wherein the plate is comprised of glass.

10. The method according to claim 1, wherein the flexible compliant pressure conveyance media further comprises a pressure chamber located on a side of the flexible compliant pressure conveyance media opposite a side of the flexible compliant pressure conveyance media that contacts the second side of the substrate.

11. The method according to claim 10, wherein the pressure chamber is inflatable to exert pressure on the flexible compliant pressure conveyance media.

12. The method according to claim 1, wherein the flexible compliant pressure conveyance media is comprised of a conforming layer mounted on a rigid plate, the flexible compliant pressure conveyance media being located between the rigid plate and the second side of the substrate.

13. The method according to claim 1, wherein the substrate and the non-cured layer are flexible, and wherein the flexible substrate and the non-cured layer are held out of contact with the cured layer until the contact portion of the bent plate presses the non-cured layer onto the cured layer as the contact portion of the bent plate is moved along the second side of the substrate.

14. The method according to claim 1, wherein the energy source is configured to increase intensity of the energy applied through the transparent window in the contact portion of the bent plate to increase from a first light level at a leading edge of the window to a second light level at a trailing edge of the window as the window is moved over the second side of the substrate.

15. The method according to claim 1, wherein the energy source is heat.

16. The method according to claim 1, wherein a plurality of cured layers are mounted on the build platform to form a stack of cured layers on the build platform, and an amount of pressure applied by the flexible compliant pressure conveyance media is controlled to apply a uniform pressure to an uppermost one of the cured layers in the stack regardless of how many of the cured layers are in the stack.

17. The method according to claim 1, wherein the amount of pressure applied by the flexible compliant pressure conveyance media is controlled by a feedback system comprised of a pressure sensor configured to provide a pressure measurement of the pressure applied to the non-cured layer by the flexible compliant pressure conveyance media, a control device coupled to receive the pressure measurement from the pressure sensor, and a build platform drive mechanism configured to drive the build platform to increase the pressure or decrease the pressure based on the pressure measurement received by the control device.

18. The method according to claim 1, wherein a plurality of cured layers are mounted on the build platform to form a stack of cured layers on the build platform, and the flexible compliant pressure conveyance media is located in a frame and is configured to move independently in the frame to self-align with an uppermost one of the cured layers on the stack.

19. A method for bonding a non-cured layer to a cured layer, comprising:
mounting the cured layer on a build platform;
mounting the non-cured layer on a first side of a substrate;
aligning the non-cured layer on the substrate with the cured layer on the build platform;
moving the cured layer and the non-cured layer into contact with one another;
applying energy to the non-cured layer from an energy source through the substrate to simultaneously cure the non-cured layer and bond the non-cured layer to the cured layer to form a bonded cured multilayer stack on the build platform, wherein the substrate is transparent to the energy; and
moving a flexible compliant pressure conveyance media into contact with the substrate, on a second side of the substrate opposite the first side which the non-cured layer is mounted on, after the cured layer and the non-cured layer have been moved into contact with one another, to apply pressure to the non-cured layer while the energy is being applied, wherein a plurality of cured layers are mounted on the build platform to form a stack of cured layers on the build platform, and wherein an amount of pressure is applied to an uppermost one of the cured layers in the stack by the flexible compliant pressure conveyance media in dependence on a number of cured layers in the stack.

20. The method according to claim 19, wherein the number of cured layers in the stack is determined by a sensor.

21. The method according to claim 19, wherein predetermined offsets in the amount of pressure applied by the flexible compliant pressure conveyance media are implemented based on the number of cured layers on the stack reaching predetermined levels.

22. The method of claim 19, wherein an amount of pressure applied to an uppermost one of the cured layers in the stack by the flexible compliant pressure conveyance media is dependent on a determination of gaps existing in the cured layers of the stack.

23. The method of claim 19, wherein an amount of pressure is applied to an uppermost one of the cured layers in the stack by the flexible compliant pressure conveyance media in dependence on variations in a gap between the non-cured layer and the uppermost cured layer of the stack.

24. A method for bonding a non-cured layer to a cured layer, comprising:
mounting the cured layer on a build platform;
mounting the non-cured layer on a first side of a substrate;
aligning the non-cured layer on the substrate with the cured layer on the build platform;
moving the cured layer and the non-cured layer into contact with one another;
applying energy to the non-cured layer from an energy source through the substrate to simultaneously cure the non-cured layer and bond the non-cured layer to the cured layer to form a bonded cured multilayer stack on the build platform, wherein the substrate is transparent to the energy; and moving a flexible compliant pressure conveyance media into contact with the substrate, on a second side of the substrate opposite the first side which the non-cured layer is mounted on, after the cured layer and the non-cured layer have been moved into contact with one another, to apply pressure to the non-cured layer while the energy is being applied, wherein the substrate is a substrate strip and is mounted on a carrier plate having a first securing device configured to secure a first end of the substrate strip to the carrier plate and a second securing device configured to secure a second end of the substrate strip, opposite the first end, to the carrier plate.

25. The method according to claim 24, wherein the method further comprises moving the non-cured layer mounted on the substrate strip into contact with the cured layer by moving at least one of the carrier plate and the build platform, releasing one of the first and second securing devices to free one of the first and second ends of the substrate strip while the other of the first and second ends remains secured, and moving the carrier plate and the build platform away from one another by moving at least one of the carrier plate and the build platform so that the substrate strip peels away from the non-cured layer mounted on the substrate strip.

26. The method according to claim 25, wherein the method further comprises:
   mounting a second non-cured layer on the first side of the substrate;
   moving the second non-cured layer mounted on the substrate strip into contact with the cured layer by moving at least one of the carrier plate and the build platform;
   releasing the other of the first and second securing devices to free the other of the first and second ends of the substrate strip while the one of the first and second ends remains secured; and
   moving the carrier plate and the build platform away from one another by moving at least one of the carrier plate and the build platform so that the substrate strip peels away from the second non-cured layer mounted on the substrate strip.

* * * * *